July 5, 1960

D. FIRTH 2,943,499

VARIABLE PITCH SHEAVE

Filed March 3, 1958

INVENTOR.
DAVID FIRTH.
BY
Eugene C. Knoblock
ATTORNEY

July 5, 1960　　　　　　D. FIRTH　　　　　2,943,499
VARIABLE PITCH SHEAVE
Filed March 3, 1958　　　　　　　　　　　　　　4 Sheets-Sheet 2
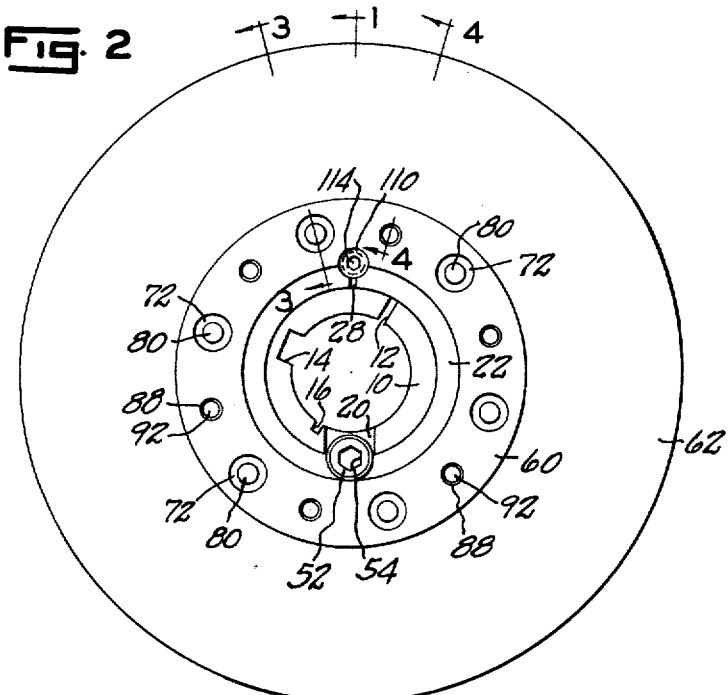
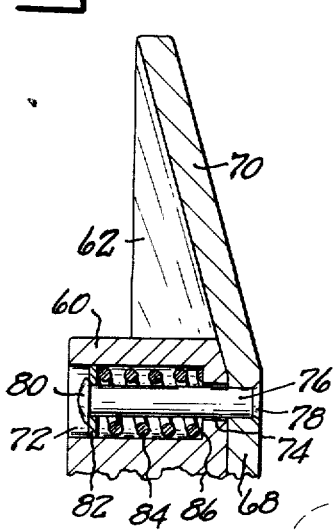
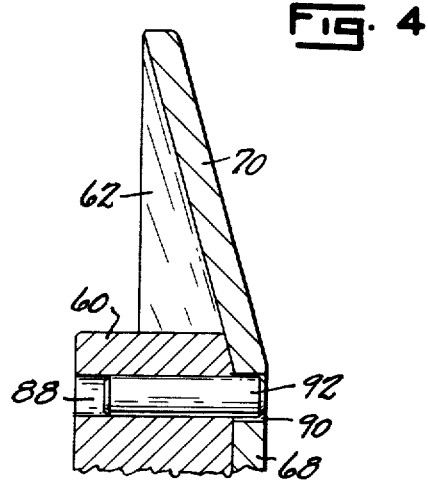
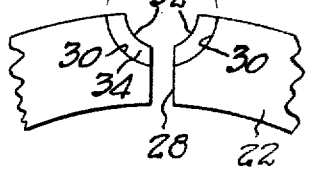
INVENTOR.
DAVID FIRTH.
BY
Eugene C. Knoblock
ATTORNEY

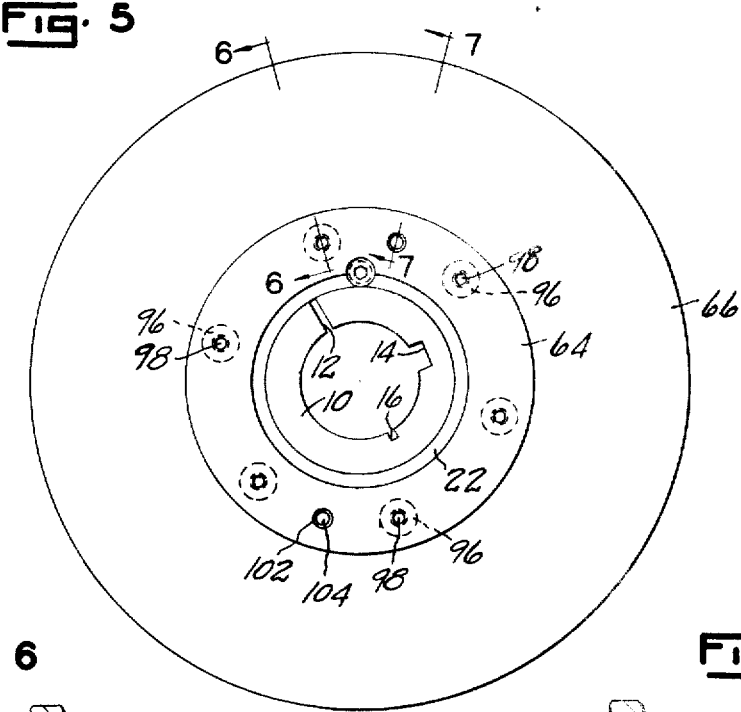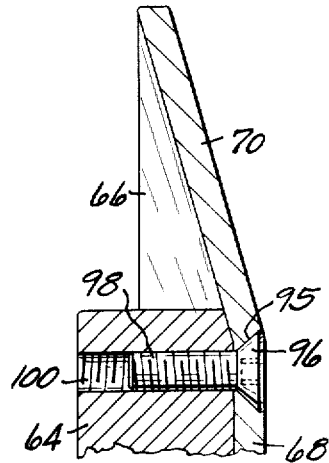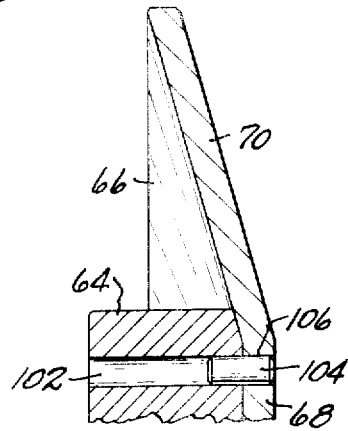

July 5, 1960 D. FIRTH 2,943,499
VARIABLE PITCH SHEAVE
Filed March 3, 1958 4 Sheets-Sheet 4

INVENTOR.
DAVID FIRTH.
BY
Eugene C. Knoblock
ATTORNEY

UNITED STATES PATENT OFFICE 2,943,499
Patented July 5, 1960

2,943,499

VARIABLE PITCH SHEAVE

David Firth, South Bend, Ind., assignor to Dodge Manufacturing Corporation, Mishawaka, Ind., a corporation of Indiana Filed Mar. 3, 1958, Ser. No. 718,539

6 Claims. (Cl. 74—230.17)

This invention relates to improvements in variable pitch sheaves, and particularly to improvements in such sheaves as the type shown in my Patent No. 2,773,393, dated December 11, 1956.

Variable pitch sheaves have long been used to drive machinery where either a predetermined speed of the driven member is necessary or where it is necessary to vary the driven speed from time to time to accommodate changes in the condition under which the driven machine operates, as on a spinning frame in the textile industry where the driven speed must vary from time to time as yarns of different weights are being spun.

There is one common and substantial fault with a variable pitch sheave of this type which results from the fact that the sheave has flanges which are adjustable relative to each other upon a hub. As tension is exerted by a V-belt upon a sheave at the adjustable flanges, and as torque varies as the sheave revolves, minute motion occurs between the adjustable flanges and the hub, which minute motion creates what is sometimes referred to as "fretting corrosion." Continuous corrosion of this character frequently causes the parts of the sheave to freeze together or to bind in such a manner as to make adjustment of the sheave very difficult.

It is the primary object of this invention to produce a construction which will eliminate the occurrence of fretting corrosion between the relatively shiftable flange and hub, so that the sheave will be freely adjustable throughout its life.

A further object of the invention is to provide a sheave of this character wherein at least one of the adjustable flanges is formed of multiple parts and is sufficiently rigid to carry a normal torque or load, but is flexible or yieldable upon the imposition of excessive torque by the belt, so that the belt-engaged parts of the flange units spread during the continued application of excessive torque without requiring or introducing any movement between the mounting hub of the sheave and the hub-engaging part of the flexible flange.

A further object is to provide a sheave of this character having a pair of adjustable flange units and means for adjustably mounting the same upon a hub, wherein at least one of the flange units is constructed of multiple parts including a hub-engaging collar and a resilient element capable of yielding to accommodate high inertia loading of the flange units, as upon starting a machine or under sudden overload, which yielding occurs independently of the collar and within the elastic limit of the resilient element and thereby insures that the resilient element will return to selected or set position upon reduction of driving torque to normal.

A further object is to provide a variable pitch sheave having a resilient element accommodating flexing of at least one of the flange portions of the sheave under high torque and return thereof to normal position when torque is reduced, and which will retain its balance and avoid vibration.

Other objects will be apparent from the following specification.

In the drawings:

Fig. 2 is an end view of the sheave as viewed from the left in Fig. 1;

Fig. 3 is a fragmentary detail sectional view taken on line 3—3 of Fig. 2;

Fig. 4 is a fragmentary sectional detail view taken on line 4—4 of Fig. 2;

Fig. 5 is an end view of the device as viewed from the right in Fig. 1;

Fig. 6 is a sectional detail view taken on line 6—6 of Fig. 5;

Fig. 7 is a sectional detail view taken on line 7—7 of Fig. 5;

Fig. 8 is an enlarged fragmentary end view of the hub as viewed from the left in Fig. 1;

Figure 1:
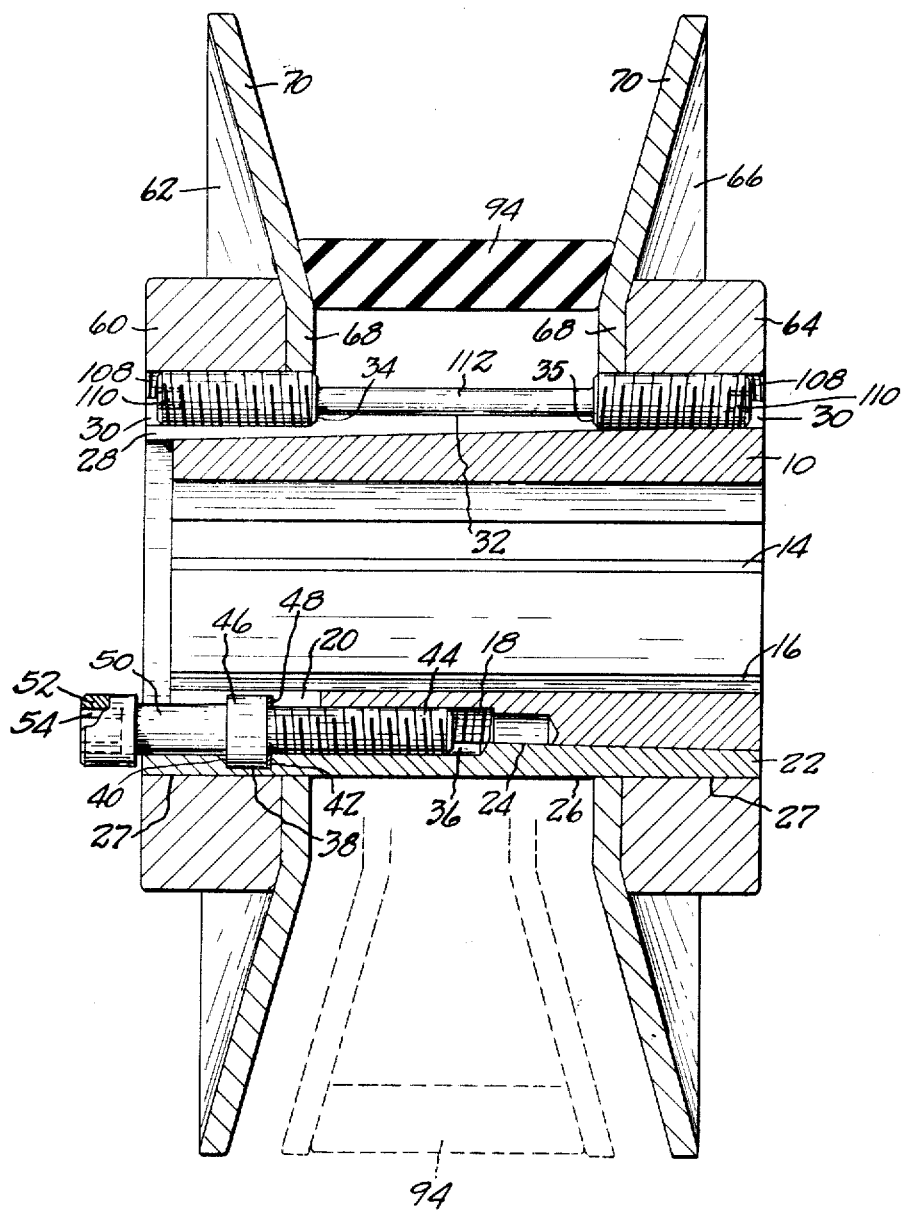
Fig. 1 is an axial sectional view taken on line 1—1 of Fig. 2, and illustrating in dotted lines an adjustment of the flange units to cause the belt to traverse the same at maximum effective diameter.

Referring to the drawings which illustrate the preferred embodiment of the invention, and particularly to Figs. 1 to 8, the numeral 10 designates an elongated bushing which is split at 12 lengthwise thereof. The interior of the bushing preferably has a longitudinal keyway 14 and, if desired, one or more grooves 16 may be formed in the inner surface of the bushing extending lengthwise thereof to accommodate flexing of the bushing between a normal position having a snug but slidable fit upon a drive shaft (not shown) and a contracted or clamping position upon said shaft. The bushing has a longitudinally tapered outer peripheral surface which is interrupted by a longitudinal groove 18 of arcuate cross-section and provided with screw-threads. The threaded groove 18 communicates with a longitudinal slot 20 at one end thereof and terminates at its opposite end spaced from the opposite end of the bushing.

A hub member 22 has an inner peripheral surface tapered similarly to the taper of the outer surface of the bushing 10 and having such diameter as to normally accommodate the bushing 10 therein in the normal or unflexed condition of that bushing. The hub 22 is preferably longer than the bushing 10 and is provided with a cylindrical outer surface 26 extending full length thereof. The hub is split at 28 lengthwise thereof. A longitudinal groove is formed in the outer surface of the hub 22, preferably at the slot 28 thereof as shown in Fig. 8. The groove is preferably arcuate in cross-sectional shape and smooth surfaced, and its portions 30 of substantially equal length at opposite ends of the hub are larger and deeper than the intermediate portion 32 thereof so as to form shoulder 34 between the groove parts 30 and 32 at the lefthand side thereof, as viewed in Fig. 1, and shoulder 35 between the groove parts at the righthand side thereof as viewed in Fig. 1.

In substantially diametrically opposed relation to the grooves 30, 32 and the split 28 of the hub 22, the inner surface of the hub is interrupted by a smooth faced longitudinal groove 36 registering with the threaded groove 18 of the bushing 10. The groove 36 extends from one end of the hub, shown in Fig. 1 as the lefthand end thereof, for a distance preferably slightly greater than one-half the length of the hub. The groove 36 is enlarged at 38 intermediate the length thereof to provide opposed shoulders 40 and 42. A screw has a threaded shank 44 meshing with the threads of the threaded groove 18 of the bushing 10 and freely rotatable in the registering groove 36 of the bushing 22. The screw has a circular concentric enlargement 46 intermediate its ends extending into the groove enlargement 38 and preferably bearing against the shoulder 40. A washer 48 may encircle the screw and be interposed between the enlargement 46 and the shoulder 42. The screw shank 50 projects endwise through the slot 36 and beyond the end of the hub and may terminate in a head 52 having a suitable tool-receiving socket 54 to accommodate rotation of the screw. It will be apparent that the rotation of the screw will serve to shift the bushing 10 endwise within the hub 22 so as to contract the bushing 10 or to permit the same to expand, depending upon the direction of rotation of the screw. Thus the screw constitutes means for effecting clamping of the bushing 10 upon the shaft or for releasing the bushing from a clamp fit upon the shaft.

Two flange units are mounted adjustably upon the hub. The lefthand unit as viewed in Fig. 1 includes a rigid collar 60 and a disk 62. The righthand flange as viewed in Fig. 1 has a rigid collar 64 and a disk 66. Each of the disks 62 and 66 has a flat central portion 68 and a frusto conical outer portion 70, and each of said disks 62 and 66 is preferably formed of plate stock of substantially uniform thickness throughout. The bores of the collars 60 and 64 are cylindrical and have a snug sliding fit upon the cylindrical outer surface 26 of the hub, and the axial dimensions thereof are sufficient to provide a large area of surface contact with the hub.

At least one of the flange units is provided with means permitting the same to yield when subjected to torque exceeding normal torque, as upon starting a machine or under sudden overload. Said means may take the form illustrated in Figs. 3 and 4, wherein the collar 60 is provided with a plurality of equispaced equiangularly related parallel recesses 72 open at the outer face thereof and equally spaced from the center of the sheave. Each recess 72 communicates at its inner end with a concentric aperture 74 through which extends the shank 76 of a rivet or pin which is preferably fixedly carried by the central flat portion 68 of the disk 62, and which may have a head 78 at one end thereof countersunk within said disk part 68. The opposed head 80 of the rivet positions an abutment such as a washer 82 slidable upon the shank 76 and within the recess 72. A coil spring 84 encircles the shank 76 and bears at one end on the washer 82 and at its opposite end on a shoulder 86 at the inner end of the recess 72. By this construction the disk 62 is held firmly in face engagement with the inner end of the collar 60 at a plurality of circumferentially spaced points but is permitted to move relative to the collar 60 against the action of the springs 84. The central opening in the flat part 68 of the disk 62 will preferably be of a diameter slightly larger than the bore of the collar 60 so that upon tilting of the disk 68 relative to the collar 60 there will be sufficient clearance between the central aperture of the disk and the hub to avoid injury to the external surface of the hub.

The collar 60 is also preferably provided with a plurality of parallel apertures 88 extending therethrough. The apertures 88 are preferably positioned centrally between adjacent recesses 72 and substantially equispaced from the axis of the sheave. An aperture 90 is formed in the flat portion 68 of the disk 62 concentric with each aperture 88 and preferably is of slightly larger diameter than the aperture 88. A pin 92 is anchored in each aperture 88 and projects into the registering aperture 90 and provides a driving connection between the disk and the collar, thereby at least partly relieving the shank 76 of each of the securing members shown in Fig. 3 from rotative stress entailed in drive transmission between the machine shaft (not shown) on which the sheave is mounted and the V-belt 94 trained around the sheave.

While the two disks of the sheave may be mounted thereon in the same manner shown in Figs. 3 and 4 and described above, it may be desirable to limit the flexibility of the sheave to one of the disks, and in that event the other disk, such as disk 66, may be mounted upon its collar 64 by the construction shown in Figs. 6 and 7. In this construction the flat portion 68 of the disk 66 is provided with a series of countersunk apertures 94 preferably equispaced from each other and from the axis of the sheave. Each aperture 94 receives the tapered head 96 of a screw having a threaded shank 98 which is screw-threaded in a threaded bore 100 in the collar 64. Additional apertures 102 may be formed in the collar 64 to mount pins 104 which project into apertures 106 in the central portion 68 of the disk 66 and have a snug or drive fit therein.

Suitable means are provided to shift the collars 60, 64 on the hub. As here shown, each of the collars 60 and 64 has a longitudinal screw-threaded groove 108 interrupting its inner surface and in register with the adjacent groove 30 in the hub 22. The threads in the grooves 108 are of opposite lead or hand. A screw is provided with a pair of spaced threaded similar end portions 110 whose threads have opposite lead so as to mesh or interfit with the threads of the adjacent groove 108. An intermediate portion 112 of the screw of a length equal to the spacing of the shoulders 34 and 35 interconnects the threaded portions 110 and fits rotatably in the groove portion 32 of the hub 22. The parts are so arranged that the screw 110, 112 may be rotated by a suitable tool inserted in a socket 114. The inner ends of the screw portions 110 bear against the shoulders 34, 35 so that endwise movement of the screw relative to the hub is prevented. The threaded engagement of the screw portions 110 with grooves 108 provides means for sliding the collars 60, 64 in an axial direction upon the hub. By this means the two flange units can be adjusted to different spacings so that the belt 94 may be seated in the base of the groove between the conical faces 70 of the flange units, as shown in full lines in Fig. 1, or may be seated at the outer peripheral portion of said groove when the flange units are adjusted toward each other to the position shown in dotted lines in Fig. 1.

It will be apparent that this sheave construction possesses all of the advantages of adjustability, firm locking upon a drive shaft, and firm locking of flange units on a hub, as the construction in my Patent 2,773,393. In other words, when the screw 50 is released to dewedge the bushing from the shaft, the hub will be dewedged from the collars 60, 64. Rotation of the screw 110 will then adjust the spacing of the flange units as desired, with the collars 60, 64 sliding freely upon the hub. After the desired setting of the parts has been effected, the screw 50 is tightened to shift the bushing and the hub axially relative to each other in a direction to cause the contacting tapered or frusto conical surface thereof to contract the bushing to cause it to clamp the shaft and to expand the split hub 22 to cause it to firmly frictionally grip the collars 60 and 64.

As the device operates, the disks 62 and 66 will maintain normal positions flat against their respective collars 60 and 64 while the sheave is operating under normal load. This result is secured by selection of springs 84 of sufficient strength to resist movement of the disk or disks 62 and 66 relative to their collars 60 and 64 under normal load conditions. When excessive loads are applied by the belt 94, the arcuate portion of each of the disks which is engaged with the belt 94 will be stressed in such a manner as to tend to separate the disk portions in that arcuate area. The springs 84 in the construction described above accommodate a limited tilting of the disk or disks held in place by such springs during the period in which the abnormal stress is exerted. Inasmuch as the sheave is rotating incident to its operation, tilting of each disk which is resiliently related to its collar is circumferentially progressive and entails substantially a wobble action of the disk relative to the collar 60. The use of a plurality of springs 84 accommodates this action, and the enlargement of the drive pin apertures 90 relative to pins 92 accommodates the wobbling action without detriment to the driving function of the device, and in particular accommodates the transmission of driving rotation between the disk 62 and collar 60. As soon as the stress exerted on the sheave returns to normal, the resiliently mounted disk 62 will assume a normal constant face-engaging relation to the collar 60 so the parts rotate as a unit and without relative motion.

I will be observed that the yielding disk or disks 62 eliminate fretting corrosion between the bores of the collars 60 and 64 and the outer surface of the hub 22 at 27 so that there is no tendency of the collars to bind upon the hub at the surfaces 27 incident to the yielding of the yieldable disk or disks. The flat or inner end face of each collar is the only area at which wear or friction due to the yielding of the yieldable disk can occur, and the position of this surface is such that no danger of fretting corrosion of a character which tends to bind the flange units so as to prevent adjustment of the sheave, can occur. Thus it is clear that the claimed construction possesses all of the desired characteristics of a variable pitch sheave and, further, overcomes the problem of fretting corrosion or of binding of the parts which has been experienced from time to time with prior constructions of variable pitch sheaves.

Figure 9:
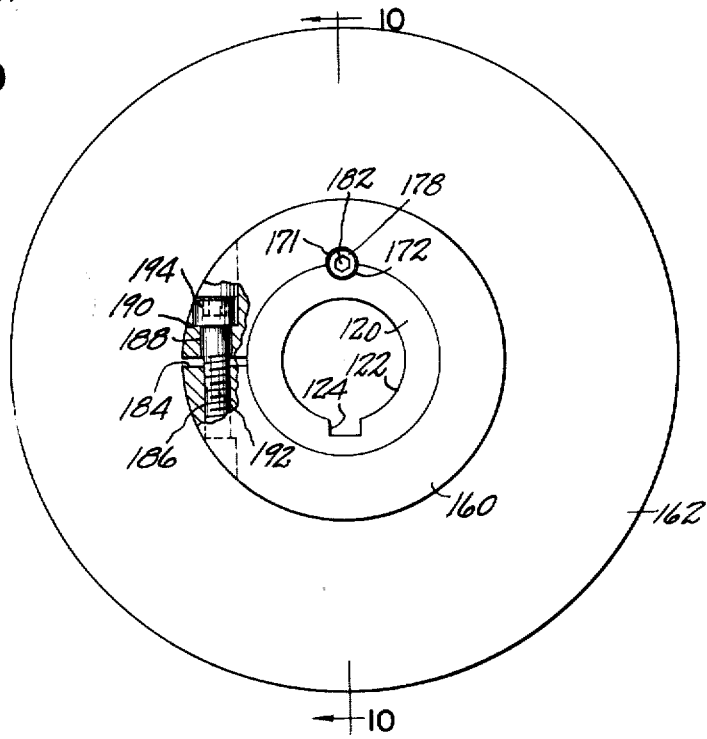
Fig. 9 is an end view of a modified sheave.
Figure 10:
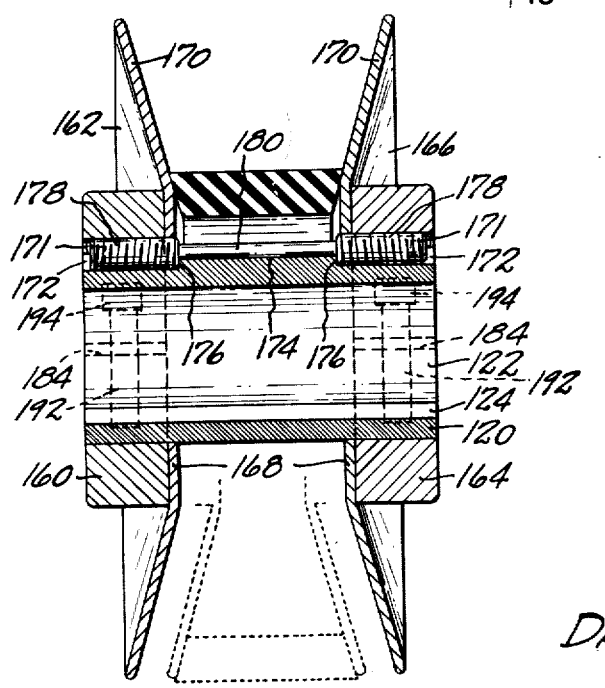
Fig. 10 is a sectional view taken on line 10—10 of Fig. 9.

An alternative embodiment of the invention is illustrated in Figs. 9 and 10. In this construction a hub 120 has a bore 122 of a size to fit the shaft (not shown) on which it is to be mounted, and preferably has a spline groove 124. The outer surface of hub 120 is cylindrical.

A pair of collars 160 and 164 are mounted adjustably on the hub 120. Collar 160 mounts a disk 162 and collar 164 mounts a disk 166. Each of the disks 162 and 166 is formed of plate stock of substantially uniform thickness and has a flat central portion 168 and a frusto conical outer portion 170. The bores of the collars 160 and 164 are cylindrical and have a normal snug sliding fit on the outer cylindrical surface of hub 120, and are of a length sufficient to provide a large area of surface contact with the hub. At least one of the disks 162, 166 is provided with means permitting the same to yield when subjected to torque exceeding normal torque, as upon starting a machine or under sudden overload. Thus one or both of the disks 162, 166 may be mounted on their respective collars by yieldable securing means of the character shown in Figs. 3 and 4. In the event that only one disk is secured by yieldable means, the other disk may be secured to its collar by securing means of the character shown in Figs. 6 and 7.

Suitable means are provided to shift the collars 160, 164 on the hub. As here shown, each collar has a longitudinal screw-threaded groove 170 interrupting its inner surface. The hub 120 has a longitudinal groove formed in its outer surface and including end portions 172 of arcuate cross-section and smooth surfaced, and a comparatively shallow intermediate portion 174. Shoulders 176 are formed between groove parts 172 and 174. A screw is provided with a pair of spaced threaded similar end portions 178 whose threads have opposite lead and mesh or interfit with the threads of the adjacent collar groove 170. An intermediate portion 180 of the screw of a length equal to the spacing between the shoulders 176 interconnects the threaded portions 178 and seats in shallow hub portion 174. At least one screw end portion 178 has an end socket 182 adapted to receive an actuating tool. Rotation of the screw serves to slide the collars axially on the hub to vary the spacing between them.

Each of the collars 160, 164 is split at 184 as seen in Fig. 9, and aligned bores are formed adjacent to the split of each collar. One bore 186 is screw-threaded, and the other bore 188 is of slightly larger diameter and smooth surfaced and has an enlarged end portion providing a shoulder 190. A machine screw has a threaded shank 192 fitting in the threaded bore 186 and has an enlarged head 194 seating against the shoulder 190. The machine screws serve to clamp the collars on the hub after proper spacing between the collars has been effected. The collars are thus fixed on the hub, but at least one of the disks 162, 166 may flex relative to the collar which mounts it in response to sudden overload by virture of the connection thereof to its mounting collar as shown in Figs. 3 and 4 and as explained above.

While the preferred embodiment of the sheave has been illustrated and described herein, it will be understood that changes in the construction may be made within the scope of the appended claims without departing from the spirit of the invention.

I claim:

1. A variable pitch sheave comprising a hub having a cylindrical exterior surface, a pair of confronting conical belt-engaging annular flange units slidably fitting on said hub, means for sliding said flange units on said hub to selected spaced relation, means for locking said flange units in frictional drive-transmitting engagement with said hub, at least one of said flange units including a rigid collar and a disk carried by and having a drive-transmitting connection with said collar, and means interconnecting said disk and collar and including a plurality of substantially equispaced and equiangularly disposed resilient means normally positioning said disk in continuous abutment with said collar, said resilient means yielding under loads to accommodate wobbling of said disk relative to said collar to accommodate increased spacing of the portions of said disks engaging said belt.

2. A variable pitch sheave comprising a hub having a cylindrical exterior surface, a pair of confronting conical belt-engaging annular flange units slidably fitting on said hub, means for sliding said flange units on said hub to selected spaced relation, and means for locking said flange units in frictional drive-transmitting engagement with said hub, at least one of said flange units including a rigid collar and a disk carried by and having a drive-transmitting connection with said collar, resilient means normally positioning said disk perpendicular to the axis of said hub and yieldable to tilt said disk relative to said collar, and drive-transmitting members interconnecting said disk and collar.

3. A variable pitch sheave comprising a hub having a cylindrical exterior surface, a pair of confronting conical belt-engaging annular flange units slidably fitting on said hub, means for sliding said flange units on said hub to selected spaced relation, means for locking said flange units in frictional drive-transmitting engagement with said hub, at least one of said flange units including a rigid collar and a disk carried by and having a drive-transmitting connection with said collar, resilient means normally positioning said disk perpendicular to the axis of said hub and yieldable to tilt said disk relative to said collar, said collar and disk having aligned apertures, said disk aperture being of slightly larger dimension than said collar aperture, and a drive pin seated in said collar aperture and projecting into said disk aperture.

4. A variable pitch sheave comprising a hub having a cylindrical exterior surface, a pair of confronting conical belt-engaging annular flange units slidably fitting on said hub, means for sliding said flange units on said hub to selected spaced relation, means for locking said flange units in frictional drive-transmitting engagement with said hub, at least one of said flange units including a rigid collar and a disk carried by and having a drive-transmitting connection with said collar, and resilient means normally positioning said disk perpendicular to the axis of said hub and yieldable to tilt said disk relative to said collar, said collar having a circumferential series of substantially equally spaced apertures having enlarged outer portions defining an intermediate shoulder, pins carried by said disk and each projecting into an aperture and carrying an abutment slidable in said outer aperture portion and a coil spring encircling said pin and bearing at its ends against said shoulder and said abutment.

5. A variable pitch sheave comprising a hub having a cylindrical exterior surface, a pair of confronting conical belt-engaging annular flange units slidably fitting on said hub, means for sliding said flange units on said hub to selected spaced relation, means for locking said flange units in frictional drive-transmitting engagement with said hub, at least one of said flange units including a rigid collar and a disk carried by and having a drive-transmitting connection with said collar, and resilient means normally positioning said disk perpendicular to the axis of said hub and yieldable to tilt said disk relative to said collar, said collar having a circumferential series of substantially equally spaced apertures having enlarged outer portions defining an intermediate shoulder, pins carried by said disk and each projecting into an aperture and carrying an abutment slidable in said outer aperture portion, and a coil spring encircling each pin and bearing at its ends against said shoulder and said abutment, said collar having a second series of apertures each positioned between a pair of said first named collar apertures, said disk having apertures aligned with and slightly larger than said second apertures, and a pin fixed in each of said second collar apertures and projecting into the aligned disk apertures.

6. In a variable pitch sheave of the type comprising a hub having a cylindrical surface, a pair of confronting conical belt-engaging similar flange units slidably fitting on said hub, and means for locking said flange units in frictional drive-transmitting engagement with said flange units, the improvement comprising the formation of at least one flange unit from multiple parts including a rigid collar, a disk abutting one end face of said collar and having a frusto conical marginal portion and resilient means interconnecting said disk and collar and yieldable to accommodate bodily tilting of said disk relative to said collar upon application of torque above a predetermined value.

References Cited in the file of this patent
UNITED STATES PATENTS

| | | |
|---|---|---|
| 2,196,923 | Johanson | Apr. 9, 1940 |
| 2,635,474 | Hennings | Apr. 21, 1953 |
| 2,773,393 | Firth | Dec. 11, 1956 |